US006338117B1

(12) United States Patent
Challenger et al.

(10) Patent No.: US 6,338,117 B1
(45) Date of Patent: Jan. 8, 2002

(54) SYSTEM AND METHOD FOR COORDINATED HIERARCHICAL CACHING AND CACHE REPLACEMENT

(75) Inventors: James R. H. Challenger, Garrison; Paul Michael Dantzig, Scarsdale; Daniel Manuel Dias, Mahopac; Arun Kwangil Iyengar, Yorktown Heights, all of NY (US); Eric M. Levy-Abegnoli, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/141,979

(22) Filed: Aug. 28, 1998

(51) Int. Cl.$^7$ ............................................... G06F 12/00
(52) U.S. Cl. ..................... 711/122; 711/134; 711/138; 711/156
(58) Field of Search ................................ 711/119, 122, 711/124, 133, 152, 156, 159, 138, 134

(56) References Cited

U.S. PATENT DOCUMENTS

| | | | | |
|---|---|---|---|---|
| 4,928,239 A | | 5/1990 | Baum et al. ................. | 711/136 |
| 5,394,555 A | * | 2/1995 | Hunter et al. ................ | 711/148 |
| 5,568,633 A | * | 10/1996 | Boudou et al. .............. | 711/141 |
| 5,802,563 A | * | 9/1998 | Hagersten et al. ........... | 711/122 |
| 5,924,116 A | * | 7/1999 | Aggarwal et al. ............ | 711/122 |
| 6,021,467 A | * | 2/2000 | Konigsburg et al. ......... | 711/122 |

FOREIGN PATENT DOCUMENTS

| | | |
|---|---|---|
| GB | 2317723 A | 4/1998 |
| WO | WO 99/48003 | 9/1999 |

OTHER PUBLICATIONS

M. Abrams et al., "Caching Proxies: Limitations and Potentials", Fourth International World Wide Web Conference Proceedings, pp. 119–133, Dec. 1996.

J. M. Nick et al., "S/390 cluster technology: Parallel Sysplex", IBM Systems Journal, vol. 36, No. 2, 1997, pp. 172–201.

D. M. Dias et al., "A Scalable and Highly Available Web Server", Proc. 41$^{st}$ IEEE Computer Society Intl. Conf. (COMPCON 1996), Technologies for the Information Superhighway, pp. 85–92, Feb. 1996.

Hunt et al., "Network Dispatcher: a connection router for scalable Internet services", Proceedings of the 7$^{th}$ International World Wide Web Conference, Apr. 1998.

* cited by examiner

Primary Examiner—Matthew Kim
Assistant Examiner—Matthew D. Anderson
(74) Attorney, Agent, or Firm—F. Chau & Associates, LLP

(57) ABSTRACT

A system and method for hierarchically caching objects includes one or more level 1 nodes, each including at least one level 1 cache; one or more level 2 nodes within which the objects are permanently stored or generated upon request, each level 2 node coupled to at least one of the one or more level 1 nodes and including one or more level 2 caches; and a storage control device for storing, in a coordinated manner, one or more objects in at least one level 1 cache and/or at least one level 2 cache, based on a set of one or more criteria. Furthermore, in a system for receiving requests for objects from one or more clients, the system having a set of one or more level 1 nodes, each containing at least one level 1 cache, a method for managing a level 1 cache includes the steps of applying, for part of the at least one level 1 cache, a cache replacement policy designed to minimize utilization of a set of one or more resources in the system; and using, for other parts of the at least on level 1 cache, one or more other cache replacement policies designed to minimize utilization of one or more other sets of one or more resources in the system.

62 Claims, 6 Drawing Sheets

SYSTEM AND METHOD FOR COORDINATED HIERARCHICAL CACHING AND CACHE REPLACEMENT

FIELD OF THE INVENTION

The present invention relates to the field of system caching. Specifically, the present invention provides a system and method for coordinated hierarchical caching in a client/server environment, particularly on the World Wide Web. Furthermore, the present invention provides a cache replacement method which adapts to changing system resource bottlenecks.

Glossary of Terms

While dictionary meanings are also implied by terms used here, the following glossary of some terms may be useful.

Client

A client is a computer which typically issues commands to one or more servers which perform the task associated with the command.

Server

Any computer that performs a task at the command of one or more computers is a server. A Web server typically supports one or more clients.

World Wide Web (Web)

The Internet's application that lets people seeking information on the Internet switch from server to server and database to database. Users can click on highlighted words or phrases of interest (hyperlinks), click on graphics such as applets or image maps, fill in forms, and enter URLs. An Internet Web server supports clients and provides information. The Web can be considered as the Internet with all of the resources addressed as URLs and which uses HTTP protocols to transfer information between computers and which uses HTML (among other formats) to display the information corresponding to URLs and provide a point-and-click interface to other URLs.

Universal Resource Locator (URL)

A way to identify or address information on the Internet.

HyperText Markup Language (HTML)

HTML is a standard device-independent representation of content on Web servers. Web servers may deliver content (including hyperlinks) to clients in HTML with confidence that the client will choose an appropriate presentation.

Hypertext Transfer Protocol (HTTP)

HTTP is an example of a stateless protocol, which means that every request from a client to a server is treated independently. Clients send request to servers and servers respond using this protocol.

Internet Browser or Web Browser

A graphical interface tool that runs Internet protocols such as HTTP, and displays results on the customer's screen. The browser can act as an Internet tour guide, complete with pictorial desktops, directories and search tools used when a user "surfs" the Internet. In this application, the Web browser is a client service which communicates with the Web servers.

Object

An object is data which can be stored in a cache.

Cache Replacement Policy

A cache replacement policy is an algorithm for determining which objects should be placed in a cache when the cache contains insufficient space to contain all objects.

BACKGROUND OF THE INVENTION

Caching is commonly used for improving performance on computer systems. By caching an object, the cost for fetching or creating the object is only incurred once. Subsequent requests for a cached object can be satisfied from the cache, a process which incurs significantly less overhead than regenerating the object or fetching it from a remote location.

Systems on the World Wide Web ("Web") today often contain browser and proxy caching (see "Caching Proxies: Limitations and Potentials" by M. Abrams et. al., "Fourth International World Wide Web Conference Proceedings," December 1996, pp. 119–133 and "World Wide Web Proxies" by A. Luotonen and K. Altis in "Computer Networks and ISDN Systems," vol. 27 (1994), pp. 147–154) to improve performance. While these caching systems are sometimes hierarchical in nature, normally caching at one level is not coordinated with caching at the next level. In other words, each cache makes decisions independently of what another cache is doing.

In U.S. Pat. No. 5,924,116 entitled "Collaborative Caching" by Yu et al., filed Apr. 2, 1997, a method for collaborative caching in a hierarchy of proxy caches is disclosed. The disclosed system bases a client's or proxy's caching decision on whether the object is cached at another proxy location in the hierarchy closer to the Web server which stores or generates the object. No cache is disclosed to be local to the Web server and the client or proxy must rely on header information contained in the object and caching status information provided by the other proxy location for its caching decision. While this system addresses general network access (browsing) speed, it does not address the problem of slow service of Web pages (such as dynamic pages) to clients from a particularly hot Web server site. The Yu system would have to be implemented across the internet's multitude of proxy servers to provide improved service from a particular Web site. Finally, it would be practically impossible to update, with the Yu system, dynamic pages (those generated "on the fly") in view of network bottlenecks and the decoupled nature of the proxies to the Web server. Thus, there is a need for a client/server system that implements a true hierarchy of caches from a Web server level to the client browser level, supports dynamic pages and coordinates the actions of the caches so that superior performance can be attained.

Level 1, level 2, etc. caches in uniprocessors are well known to those skilled in the art. However, while level 1 and level 2 processor caches are often coordinated to some extent (for example, the decision to place an object in one processor cache might be made depending on whether the object is contained in another processor cache), the client/server environment has characteristics which pose different problems to a caching system. First, in the client/server environment, there can be multiple level 2 (server) caches located behind a level 1 (e.g., router) cache, all with different contents. In contrast, a uniprocessor contains, at most, one level 2 cache. Second, compared with processor caches, there are more constraints over what can be stored in these router and server caches. For example, in a Web-based client/server environment, it may be necessary to keep some URLs out of a router cache in order to force a particular request to be directed to a server. It is also undesirable to cache objects (e.g., static pages) in server caches which are inexpensive for the Web server to generate. This would not be the case for processor caches because level 2 caches are generally faster than main memory. Third, the parameters affecting admittance to the cache and cache replacement are significantly different for the two environments. In processor caching, least recently used (LRU) information generally suffices. In Web-based client/server systems, considerations such as the expected number of accesses per unit time, expected lifetime, object size and time to create or fetch the object are important to consider.

Another prior art system is the Parallel Sysplex in the System 390 (Special Issue on S/390 Parallel Sysplex Cluster, IBM Systems Journal, Vol. 36, No. 2, 1997). The Parallel Sysplex has level 1 database caches in each of the processing nodes and a level 2 cache in the coupling facility, which is shared among the nodes. While the level 1 and level 2 caches in the Sysplex are coordinated, there are several differences between the Sysplex and a client/server system.

In the Sysplex, the database system runs at the same node as the level 1 cache, the level 2 cache is on a shared coupling facility and the permanent data is located on shared disks accessed from the node at which the level 1 caches reside. In a client/server system, however, remote clients may have to make requests which initially go to the level 1 cache, while the permanent locations of the data are at the nodes at which the level 2 caches reside. Furthermore, the criteria for placing objects in the level 1 or level 2 caches are very different for the two systems. In the Sysplex, hot shared records/objects, especially those frequently updated, are placed in the level 2 coupling facility cache. In the client/server case, there is no concept of sharing (i.e. programs at different Sysplex nodes that access and update the same object), and the criteria for caching objects should include the size of the objects, the hotness (desirability measured by hits) of the objects, the time to create or fetch the objects, and the update rate. Therefore, there is a need for a coordinated hierarchical caching system directed to the client/server environment where a level 2 cache is located where the objects are permanently stored or generated.

In many cases, caches do not have sufficient memory to store all cacheable objects at one time. Selectivity must be applied in determining which objects should be cached when the cache is full or almost full. To address this problem, a number of cache replacement algorithms exist in the prior art such as that disclosed in U.S. patent application Ser. No. 08/958,506 entitled "A New Algorithm for Cache Replacement" by Challenger et al., filed Oct. 27, 1997 and herein incorporated by reference. These algorithms, however, have been designed to address the problem of a single system bottleneck such as a system processor. Networked systems generally may suffer from at least one of several potential bottlenecks at any given time. In addition, the bottleneck(s) having the dominant impact on performance may change over time.

Therefore, there is a need for an algorithm that can handle situations where one of several resources (e.g., server CPU, router CPU, network bandwidth) might create bottlenecks and where the resource which is causing the bottleneck (if any) may change dynamically.

SUMMARY OF THE INVENTION

The present invention provides a system for hierarchically caching objects including one or more level 1 nodes, each including at least one level 1 cache; one or more level 2 nodes within which the objects are permanently stored or generated upon request, each level 2 node coupled to at least one of the one or more level 1 nodes and including one or more level 2 caches; and storing device for storing, in a coordinated manner, one or more objects in at least one level 1 cache and/or at least one level 2 cache, based on a set of one or more criteria.

The set of one or more criteria preferably include at least one of: a size of one or more of the objects, a storage space available in one or more of the caches, a CPU load on one or more of the level 1 nodes, a CPU load on one or more of the level 2 nodes, a pattern of data accesses to one or more of the objects, a frequency of update of one or more of the objects, a time to create or fetch one or more of the objects, and network traffic between one or more of the level 1 nodes and one or more of the level 2 nodes.

The level 1 nodes can be Web server accelerators, routers or Web servers. The nodes are preferably disposed within an encapsulated cluster.

The system of the present invention can include one or more level 3 nodes coupled to at least one of the one or more level 2 nodes and wherein the storing device comprises a device for storing one or more objects in at least one level 3 cache and/or at least one of the at least one level 1 cache, the at least one level 2 cache and the at least one level 3 cache.

Finally, the present invention also provides a system for hierarchically caching objects including one or more level I nodes, each including at least one level I cache, for all integers I such that $L>=I>0$ where $L>=3$, wherein the objects are permanently stored or generated on at least one of the nodes; and a storing device for storing, in a coordinated manner, one or more of the objects in at least one level j cache and/or at least one level k cache where $L>=k>j>0$, based on a set of one or more criteria.

The present invention also provides a method for caching objects including the steps of: providing one or more level 1 nodes, each including at least one level 1 cache; providing one or more level 2 nodes within which the objects are permanently stored or generated upon request, each level 2 node coupled to at least one of the one or more level 1 nodes and including one or more level 2 caches; and storing one or more objects in at least one level 1 cache and/or at least one level 2 cache, in a coordinated manner based on a set of one or more criteria.

Preferably, the set of one or more criteria includes at least one of: a size of one or more of the objects, a storage space available in one or more of the caches, a CPU load on one or more of the level 1 nodes, a CPU load on one or more of the level 2 nodes, a pattern of data accesses to one or more of the objects, a frequency of update of one or more of the objects, a time to create or fetch one or more of the objects, and network traffic between one or more of the level 1 nodes and one or more of the level 2 nodes.

The storing step preferably includes the step of maintaining information that one or more objects should not be cached in at least one level 1 cache.

The method of the present invention preferably further includes the steps of: receiving, at the one or more level 1 nodes, a request for an object from a client; determining whether the requested object is in the at least one level 1 cache; transmitting, in response to the object being found in the at least one level 1 cache, the object from the at least one level 1 cache to the client; and attempting, in response to the object not being found in the at least one level 1 cache, to satisfy the request from the at least one level 2 cache. The attempting step preferably includes the steps of: forwarding the object to at least one of the one or more level 2 nodes; determining whether the object is in at least one level 2 cache corresponding to the at least one of the one or more level 2 nodes; and sending, in response to the object being found in the at least one level 2 cache, the object from the level 2 cache to the client. Preferably, the method further includes the steps of identifying the object as being sufficiently hot; and moving the object or a copy of the object to a level 1 cache.

Preferably, at any specific time, an object is stored in, at most, one of the level 2 caches.

The method of the present invention preferably further includes the step of preventing the caching of an object in a level 2 cache where a cost of providing the object from the level 2 cache is high relative to a cost of providing the object from a level 2 node corresponding to the level 2 cache. The cost of providing the object from the level 2 cache preferably includes a cost of at least one invalidation and updating of the object in the cache after its value changes.

The method of the present invention preferably further includes the step of caching, in response to a level 1 cache being full, an object in a level 2 cache.

The method of the present invention preferably further includes the step of preventing an object from being cached in a level 1 cache. It is also preferable that the method further includes the step of allowing the object to be cached in at least one level 2 cache. The preventing step is made necessary due to a difficulty of maintaining sufficiently current values of the object in the level 1 cache or because the request for the object causes a side effect on a level 2 node.

The storing step preferably includes the step of determining the object to be a general cache candidate. The determining step can include the step of checking a text string or header information associated with the object, the step of applying a function to the object (such as determining the size of the object or determining the expected lifetime of the object).

The storing step preferably includes the step of identifying the object to be a level 1 cache candidate. The identifying step can include the step of determining the size of the object, determining any limits in logging facilities of the associated level 1 node or determining sufficient space in the level 1 cache.

The storing step preferably includes the step of identifying the object to be a level 2 cache candidate. The identifying step can include the step of determining the object not to be a level 1 cache candidate, the step of determining the size of the object, or the step of determining sufficient space in the level 2 cache.

The storing step preferably includes the step of applying a cache replacement policy. The applying step can include the steps of applying, for part of the at least one level 1 cache, a cache replacement policy designed to minimize utilization of a set of one or more resources in the system; and using, for other parts of the at least one level 1 cache, one or more other cache replacement policies designed to minimize utilization of one or more other sets of one or more resources in the system.

The present invention also provides a method for caching objects comprising the steps of: providing one or more level I nodes, each including at least one level I cache, where L>=3 and I is an integer such that L>=I>0, wherein the objects are permanently stored or generated on at least one of the nodes; and storing, in a coordinated manner, one or more objects in at least one level j cache and/or at least one level k cache where L>=k>j>0, based on a set of one or more criteria. The set of one or more criteria preferably includes at least one of: a size of one or more of the objects, a storage space available in one or more of the caches, a CPU load on one or more of the level I nodes, a pattern of data accesses to one or more of the objects, a frequency of update of one or more of the objects, a time to create or fetch one or more of the objects, and network traffic between one or more of the level I nodes, the level j nodes and/or the level k nodes.

Another aspect of the present invention is the novel cache replacement method used by the Web server accelerator (e.g., router). This method for determining which objects should be placed in a cache is particularly useful when multiple parameters affecting the desirability of caching objects are non-uniform across objects. Such parameters include the frequency with which an object is accessed, object size, the time to calculate an object or fetch it from a remote location, and the lifetime (i.e. time between updates) of an object.

Using the method of the present invention, a router applies a combination of three cache replacement algorithms to manage different parts of its cache. One replacement algorithm is designed for optimal performance when server CPUs are the bottleneck. Another replacement algorithm is designed for optimal performance when the router CPU is the bottleneck. The third algorithm is designed for optimal performance when the network between the router and the server(s) is the bottleneck. When one of the three aforementioned resources becomes a bottleneck, the router increases the amount of cache storage space managed by the replacement algorithm designed to minimize consumption of the bottleneck resource. Another technique of the present invention which is sometimes used to improve performance when a resource becomes a bottleneck is to vary the percentage of requests which bypass the router's cache and are sent directly to a server.

Particularly, the present invention provides, in a system adapted to receive requests for objects from one or more clients, the system having a set of one or more level 1 nodes, each containing at least one level 1 cache, a method for managing a level 1 cache including the steps of: applying, for part of the at least one level 1 cache, a cache replacement policy designed to minimize utilization of a set of one or more resources in the system; and using, for other parts of the at least one level 1 cache, one or more other cache replacement policies designed to minimize utilization of one or more other sets of one or more resources in the system.

The cache replacement policy is preferably designed to minimize resources on a level 1 node containing the level 1 cache. Here, the cache replacement policy can estimate a desirability of caching an object from an expected number of hits to the object per unit time if the object is cached divided by a size of the object. Preferably, the cache replacement policy estimates the desirability of caching the object by calculating or estimating the quantity $(1/a-p/u)/s$, where a is the expected time between successive requests for the object, u is the expected time between successive updates of the object, p is the probability that the object will be accessed between successive updates to the object, and s is the size of the object.

Where the system further has one or more level 2 nodes coupled to one or more of the level 1 nodes, the cache replacement policy is preferably designed to minimize resources on at least one level 2 node. Here, the cache replacement policy can estimate the desirability of caching an object from the expected number of hits to the object per unit time if it is cached multiplied by the expected processing time on one or more of the level 2 nodes to fetch or calculate the object divided by the size of the object. The cache replacement policy preferably estimates the desirability of caching the object by calculating or estimating the quantity $(ta-t*p/u)/s$, where a is the expected time between successive requests for the object, t is the expected processing time on one or more of the level 2 nodes to fetch or calculate the object, u is the expected time between successive updates of the object, p is the probability that the object will be accessed between successive updates to the object, and s is the size of the object.

Where the system further has one or more level 2 nodes and one or more networks located between the one or more level 1 nodes and the one or more level 2 nodes, the cache replacement policy is preferably designed to minimize traffic on one or more of the networks. Here, the cache replacement policy can estimate the desirability of caching an object from the expected number of hits to the object per unit time if the object is cached. Preferably, the cache replacement policy estimates the desirability of caching the object by calculating or estimating the quantity $1/a-p/u$, where a is the expected time between successive requests for the object, u is the expected time between successive updates of the object, and p is the probability that the object will be accessed between successive updates to the object.

It is preferable that the method of the present invention also include the step of dynamically varying the parts of the level 1 cache managed by at least one of the cache replacement policies.

Preferably, the method further includes the steps of determining one or more resource bottlenecks corresponding to one or more resources; and dynamically varying, in response to the determining step, the parts of the level 1 cache managed by at least one of the cache replacement policies. The dynamically varying step preferably includes the step of increasing, in response to the determining step, the part of the level 1 cache managed by a cache replacement policy designed to minimize utilization of the one or more resources.

The system can further have one or more level 2 nodes and one or more networks between the one or more level 1 nodes and the one or more level 2 nodes, wherein the one or more resources becoming a bottleneck contain at least one of: processing power of the level one node containing the level 1 cache, processing power of at least one of the level 2 nodes and bandwidth of at least one of the networks.

In a system adapted to receive requests for objects from one or more clients, the system having one or more level 1 nodes, each containing at least one level 1 cache, and having one or more level 2 nodes coupled to one or more of the level 1 nodes, a method for handling requests in the system includes the steps of: determining a level 1 node to be a bottleneck in the system; and sending, in response to the determining step, one or more requests to one or more level 2 nodes without first attempting to satisfy the one or more requests from a level 1 cache on the level 1 node.

In a system adapted to receive requests for objects from one or more clients, the system having a set of one or more level 1 nodes, each containing at least one level 1 cache, one or more level 2 nodes, and one or more networks between the one or more level 1 nodes and the one or more level 2 nodes, a method for handling requests in the system includes the steps of: determining at least one of the networks or at least one of the level 2 nodes to be a bottleneck in the system; and reducing, in response to the determining step, the number of requests sent to the one or more level 2 nodes without first attempting to satisfy the request from a level 1 cache.

Preferably, where the system further includes one or more level 2 nodes coupled to one or more level 1 nodes, the method further includes the step of: determining a level 1 node to be a bottleneck in the system; and sending, in response to the determining step, one or more requests to one or more level 2 nodes without first attempting to satisfy the one or more requests from a level 1 cache on the level 1 node.

Preferably, where the system further comprises one or more level 2 nodes and a network between the one or more level 1 nodes and the one or more level 2 nodes, the method further includes the steps of: determining at least one of the network or the level 2 nodes to be a bottleneck in the system; and reducing, in response to the determining step, the number of requests sent to one or more level 2 nodes without first attempting to satisfy the request from a level 1 cache.

Finally, the method of the present invention preferably includes the steps of determining, in response to the object not being found in the at least one level 1 cache, whether the requested object should be cached in any level 1 cache and satisfying, in response to the determination that the object should not be cached in any level 1 cache, the request in an optimized fashion. The satisfying step preferably includes the step of returning a response to the client from a level 2 node through at least one of the one or more level 1 nodes, bypassing the at least one level 1 cache or the step of returning a response to the client from a level 2 node, bypassing at least one of the one or more level 1 nodes.

BRIEF DESCRIPTION OF THE DRAWING

The present invention will be understood by reference to the drawing, wherein.

DETAILED DESCRIPTION OF THE PREFERRED EMBODIMENT

Figure 1:
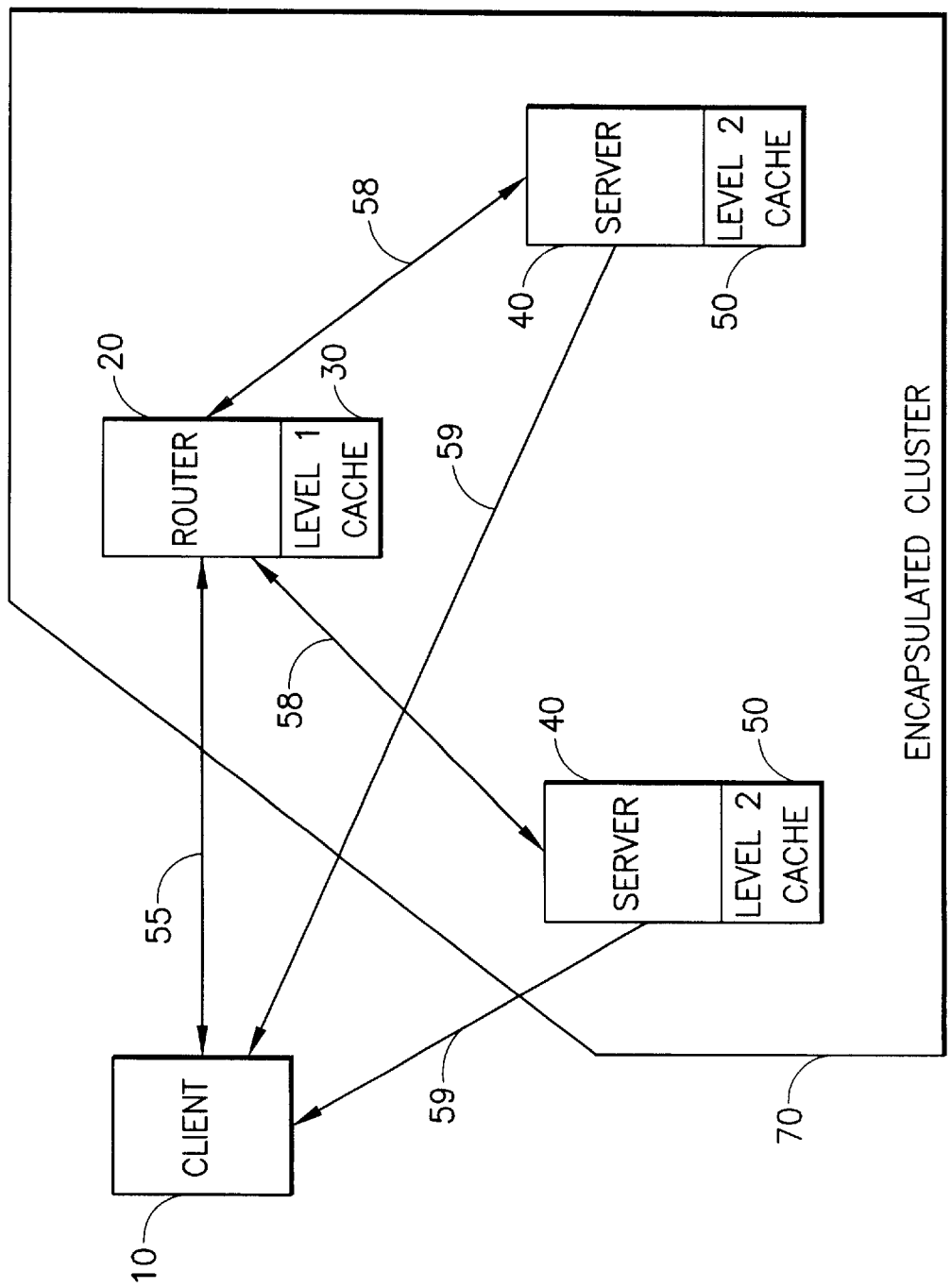
FIG. 1 is a schematic diagram of an embodiment of a coordinated hierarchical caching system according to the present invention.

FIG. 1 depicts an embodiment of a coordinated hierarchical caching system according to the present invention. As shown, a client 10 communicates requests over a network link 55 to an encapsulated cluster 70 comprised of a Web server accelerator or router 20 (level 1 node) and two Web servers 40 (level 2 nodes). An encapsulated cluster is described in U.S. patent application Ser. No. 08/947,361 entitled "Affinity-Based Router and Routing Method" by Devarakonda et al., filed Dec. 23, 1996 (provisional effective filing date), which is hereby incorporated by reference. Other embodiments of the present invention can include the level 1 and level 2 nodes without the encapsulated cluster 70.

Within the encapsulated cluster 70, the two servers 40 communicate with the Web server accelerator 20 over network links 58. The Web server accelerator (hereinafter "router") 20 may actually be any processor system which can communicate with other nodes over the network links 58. One embodiment of the system of the present invention includes a TCP router as a Web server accelerator (see Attanasio, Clement R. and Smith, Stephen E., "A Virtual Multi-Processor Implemented by an Encapsulated Cluster of Loosely Coupled Computers", IBM Research Report RC 18442, 1992; Attanasio, Clement R. and Smith, Stephen E., "Method and Apparatus for Making a Cluster of Computers Appear as a Single Host"; U.S. Pat. No. 5,371,852, Dec. 6, 1994; and Dias, D. M., Kish, W., Mukherjee, R., and Tewari, R., "A Scalable and Highly Available Web Server", Proc. 41st IEEE Computer Society Intl. Conf. (COMPCON) 1996, Technologies for the Information Superhighway, pp. 85–92, February 1996), such as an IBM 2210 or 2216, which routes requests to multiple processors, each running a Web server. Although two servers 40 are pictured in FIG. 1, according to the present invention, there can be one or more servers in this architecture with one or more network links. In order to take advantage of the coordinated hierarchical structure of the present invention, it is preferable that all requests transmitted from the client 10 to the encapsulated cluster 70 initially are directed to the router 20. However, one skilled in the art could appreciate that some requests to the encapsulated cluster 70 can be transmitted directly to the Web server(s) 40. Furthermore, the present invention can be implemented with multiple network links connecting the router 20 to one or more servers 40.

When the router 20 receives a request from the client 10, the router 20 might route the request to a server without looking at the request. The router 20 can choose the appropriate server 40 to route the request to using a variety of methods including, but not limited to, a round robin method or schemes which take the load of the servers 40 into account (see "Network Dispatcher: a connection router for scalable Internet services" by G. Hunt et al. in Proceedings of the 7th International World Wide Web Conference, April 1998). In this situation, when the router 20 has not examined the request's contents, the server 40 handling the request can respond directly to the client 10 over network link 59. The response to the request does not have to go through the router 20.

Alternatively, to take advantage of the system of the present invention, the router 20 might examine the request upon its receipt. By examining the request, the router 20 can determine whether the request can be satisfied from data in its level 1 cache 30. If not, the request is routed to a server 40 over network link 58. The method for routing the request to a particular server 40 may be, but is not limited to, one of the following: a round robin method, a scheme which takes the load of the servers 40 into account or a content-based approach which bases routing decisions on the contents of the request. In any case, the router 20 must close its connection with the client 10 in order to examine the request in this embodiment. After the request is examined, the router 20 functions as a proxy and establishes a new connection with a server 40 over a network link 58 in order to satisfy the request. The server 40 sends a response to the request back over the network link 58 to the router 20 which subsequently forwards the response back to the client 10 over the network link 55. One skilled in the art could adapt the present invention to systems in which the servers 40 could send results to the client 10 directly, over network links 59 without going through the router 20 even if the router 20, examined the contents of the request.

Coordinated caching between the router 20 and servers 40 is necessary due to the characteristics of the client/server system of the present invention. The router (level 1) cache 30 can serve Web data an order of magnitude faster than the Web servers 40 can. In order to achieve fast performance, all objects cached in the router cache 30 must be cached in memory. Since the router memory is limited in size, it is often not possible to cache all hot objects at the router. Each Web server (level 2) cache 50 is significantly slower than the router cache 30, but has more memory. The server caches 50 are generally used to cache dynamic pages which are expensive to create. In many cases, no performance advantage is conveyed by caching static pages at the servers 40 because static pages often can be delivered via the Web servers 40 themselves more cheaply than via their associated server caches 50. By contrast, the router cache 30 can generally deliver static pages significantly more cheaply than a Web server 40 can. Therefore, the router cache 30 is much better suited for caching static pages than any of the server caches 50 are. In addition, due to the router's superior performance, it is also beneficial to cache hot dynamic pages in the router 20.

According to the present invention, the router cache 30 is used to store the hottest objects. Objects which cannot fit in the router cache 30 may instead be stored in a server cache 50. Some objects can be cached at the router 20, but not at the servers 40. Examples of such pages are static pages for which little, if any, CPU time would be saved by caching at a server 40. Furthermore, some pages are not permitted to be cached at the router 20. Examples of such pages are dynamic pages for which it is not feasible to maintain current copies in the router cache 30 and dynamic pages which cause side-effects at the servers 40.

Figure 2:
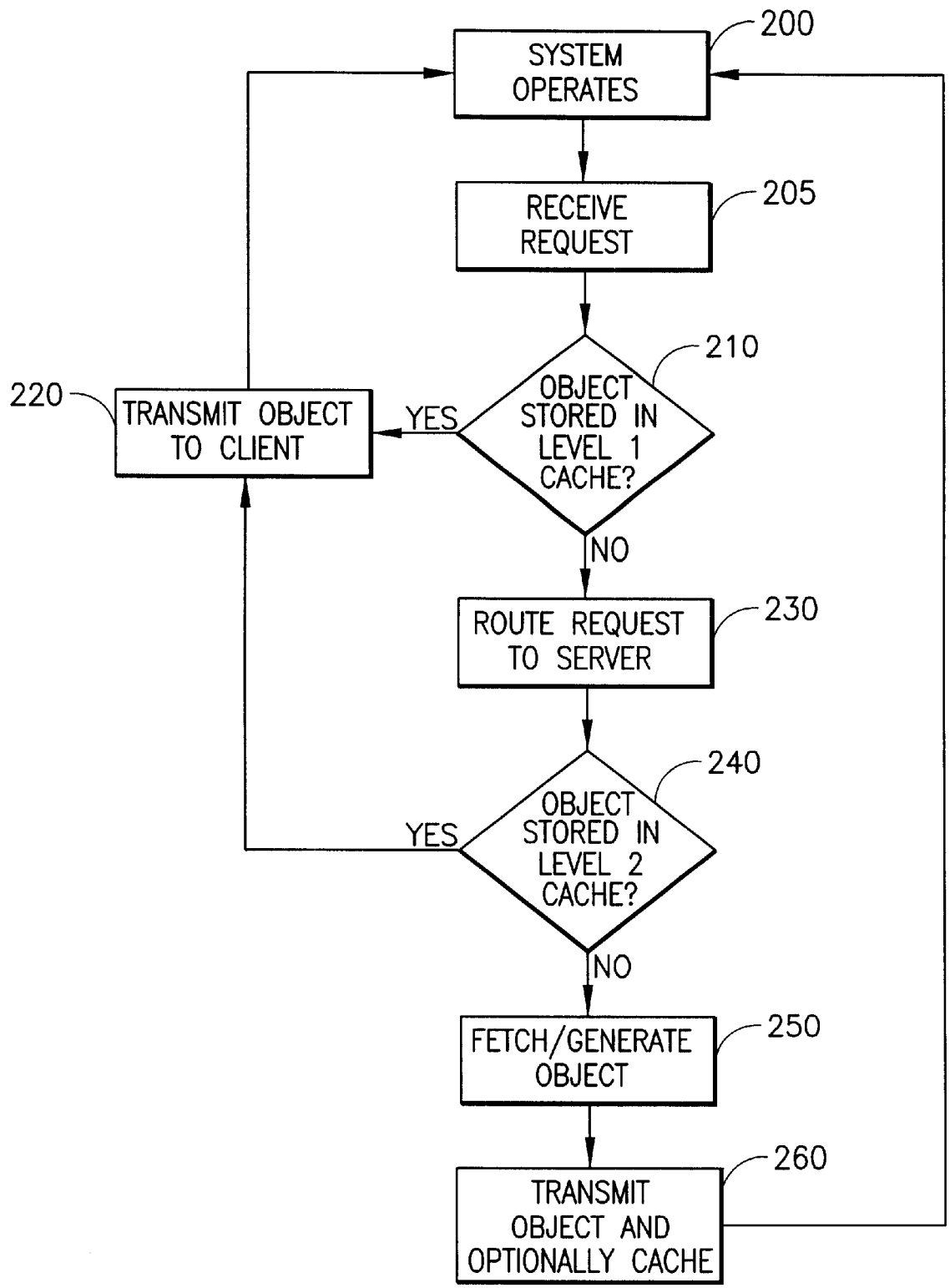
FIG. 2 is a block diagram of a method for serving objects from caches to clients according to an embodiment of the present invention.

FIG. 2 shows how a preferred embodiment of the system of the present invention handles client requests. In step 200, the encapsulated cluster 70 performs conventional operations such as routine computations. In step 205, the encapsulated cluster 70 receives a request from a client 10. In step 210, the router 20 determines whether the requested object is stored in its level 1 cache 30. If it is stored as such, the object is transmitted from the level 1 cache 30 to the client 10 over network link 55 in step 220 and the process continues in step 200. If the requested object is not stored in the level 1 cache 30, the request is routed to a server 40 in step 230. As described hereinabove, the method for routing the request to a server 40 may be, but is not limited to, one of the following: a round robin method, a scheme which takes the load of the servers into account or a content-based approach which bases routing decisions on the request contents.

In step 240, the server 40 receiving the forwarded request looks for the object in its level 2 cache 50. If the object is located in the level 2 cache 50, the cached object is returned to the client 10 in step 220 and system operation continues in step 200. Preferably, if the system determines that the object is sufficiently hot, and the object is identified as being cacheable (see description associated with FIG. 3 hereinbelow) at the router 20, the object may be moved from the level 2 cache 50 to the level 1 cache 30 (step not shown). The system can optionally retain a cached copy of the object in the level 2 cache 50 after moving it to the level 1 cache 30. If it is determined, in step 240, that the object is not contained in the level 2 cache 50, the server 40 fetches or generates the page in step 250. Alternatively, in step 240, the system examines multiple level 2 caches for the requested object. While some (static) objects are fetched from the file system, other (dynamic) pages are created by programs which execute on the server 40 which could potentially invoke programs on other computers besides the server 40.

In step 260, the fetched/generated object is transmitted to the client 10 and the system optionally caches the object. If the object was generated by a request which caused a side-effect (changed a state, such as modifying a file) on the server 40, the object likely would not be cached for practical purposes. Furthermore, if the server 40 determines that caching the object would not lead to significant savings in a limiting resource or that the cost and/or difficulty of keeping a sufficiently updated copy of the object would be prohibitive, the object likely would not be cached. However, if it is determined that the object should be cached, the method depicted in FIG. 3 is, preferably, applied to place the object in zero or more caches as appropriate.

Figure 3:
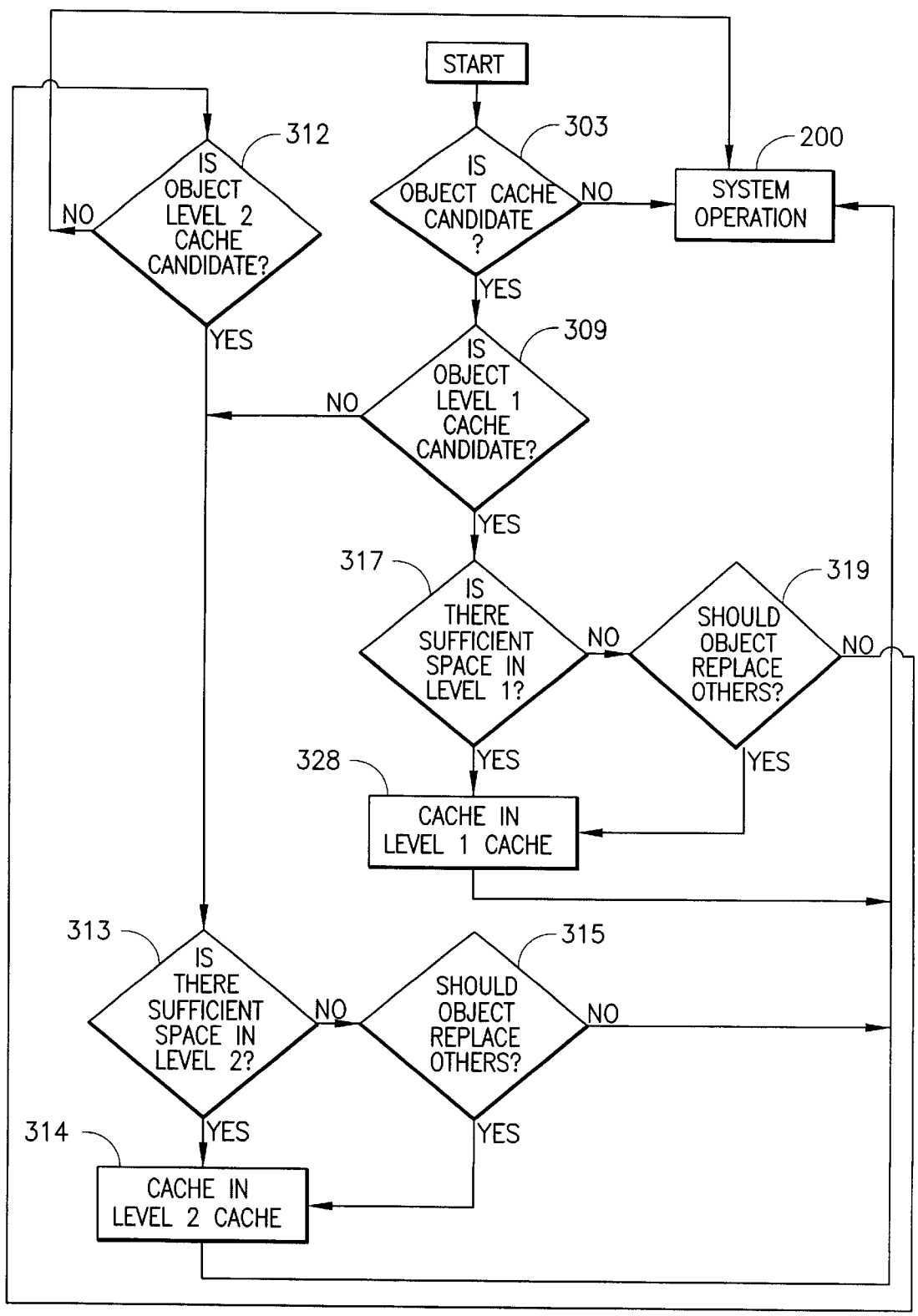
FIG. 3 is a block diagram of a method for caching objects according to an embodiment of the present invention.

FIG. 3 shows a preferred method of caching objects according to another aspect of the present invention. Upon pre-fetching objects or after transmitting a fetched/generated object to a client, the system determines, in step 303, whether an object O is, generally, a cache candidate. This step can be handled in a number of ways. For example, O might have data associated with it (e.g. a text string or a header such as a HTTP header) which indicates whether or not it should be cached. Alternatively, a function could be applied to determine whether O should be cached. For example, the function could determine the size of O and determine that O should not be cached if its size is too large. As another example, the function could determine the expected lifetime of the object and determine that O should not be cached if its expected lifetime is too short. One skilled in that art will appreciate that various other schemes could be applied for determining whether O is a cache candidate.

Figure 4:
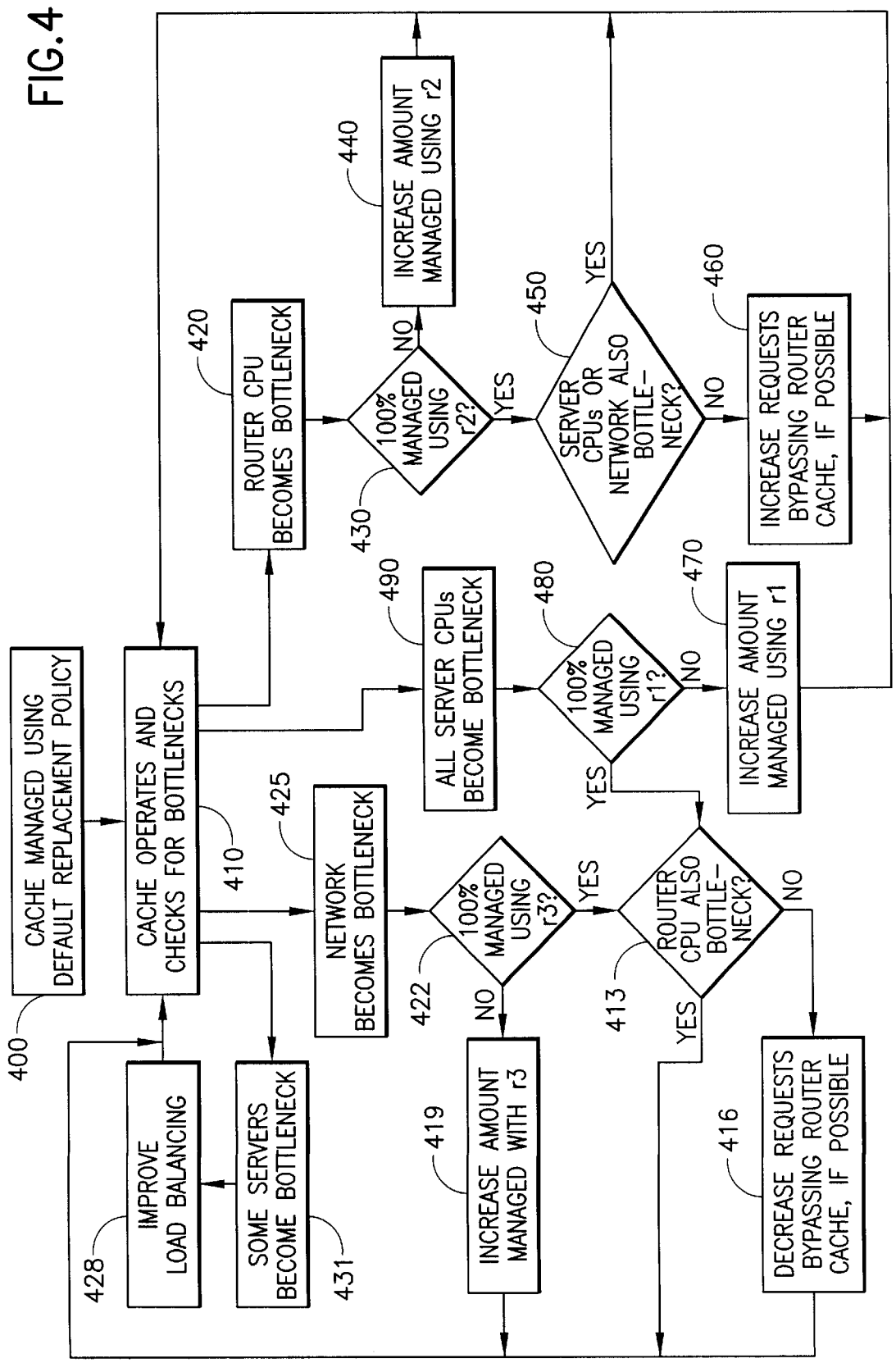
FIG. 4 is a block diagram of an algorithm for dynamically varying cache replacement policies used by routers according to an embodiment of the present invention.

If it is determined that the object O is a cache candidate, the system determines, in step 309, whether O is a cache candidate at the level 1 cache 30. Some of the criteria used for this determination are the size of the object and any limits in the logging facilities of the level 1 node. If it is determined that O is not a cache candidate at the level 1 cache 30, processing continues at step 313. If it is determined that O is a cache candidate at the level 1 cache 30, the system determines whether sufficient space exists in the cache for O, in step 317. If sufficient space exists in the cache for O, O is added to the level 1 cache 30 in step 328. If it is determined that O is a cache candidate at the level 1 cache 30 but that insufficient space exists in the cache for O, a cache replacement algorithm is used, in step 319, to determine whether O should replace one or more other objects in the level 1 cache 30. If it is determined that O should replace one or more other objects in the level 1 cache 30, the system, in step 328, caches O and removes one or more objects identified by the cache replacement algorithm in step 319 in order to make room for O. Furthermore, one or more of the objects removed from the level 1 cache 30 as a result of the replacement algorithm may be cached at one or more level 2 caches 50 in step 328. While it is possible to use other cache replacement algorithms in step 319, the preferred cache replacement algorithm is depicted in FIG. 4.

If it is determined, in step 319, that O should not replace one or more other objects in the level 1 cache 30, the system determines, in step 312, whether O is a cache candidate at a level 2 cache 50. In a preferred embodiment, each object is stored or generated and cached at a specific level 2 node. One skilled in the art will appreciate that, in another embodiment, the system could allow an object to be cached at multiple level 2 nodes. In this case, steps 312, 313, 314 and/or 315 could be applied to multiple level 2 caches for the same object.

If it is determined, in step 312, that O should not be cached at a level 2 cache 50, processing continues at step 200. If it is determined that O is a cache candidate at a level 2 cache 50, the system determines whether sufficient space exists in the level 2 cache 50 for O, in step 313. If sufficient space exists in the cache for O, O is added to the level 2 cache 50 in step 314. If it is determined that O is a cache candidate at the level 2 cache 50 but that insufficient space exists in the cache for O, a cache replacement algorithm is applied, in step 315, to determine whether O should replace one or more other objects in the level 2 cache 50. If it is determined that O should replace one or more other objects in the level 2 cache 50, the system, in step 314, also removes one or more objects identified by the cache replacement algorithm in step 315 in order to make room for O. An extension of this algorithm which could be performed by one skilled in the art is to cache O at multiple level 2 caches 50 in step 315. While it is possible to use other cache replacement algorithms, the preferred cache replacement algorithm applied in step 315 is described in Challenger et al. Finally, if it is determined that O should not replace one or more other objects in the level 2 cache 50, the system continues normal operation in step 200.

Another aspect of the present invention is the preferred method for handling cache replacement at the level 1 cache 30. This method can be used with any system employing a cache similar to the cache on a Web server accelerator such as the router 20 and is not limited to systems employing hierarchical caching and/or multiple servers. A key feature of the method is that it optimizes performance, whether the performance bottleneck of the system is router processing power, server processing power, or the network between the server(s) and the router.

Suppose that server processing power is the bottleneck in the system. The desirability of caching an object O at the level 1 cache 30 is proportional to the expected number of hits to O per unit time if it is cached multiplied by the expected server processing time to fetch or calculate O divided by the size of O. One formula for estimating the caching desirability is:

$$d1(O)=(t/a-t*p/u)/s$$

where a is the expected time between successive requests for O, t is the expected server processing time to fetch or calculate O, u is the expected time between successive updates of O, p is the probability that O will be accessed between successive updates to O, and s is the size of O. One skilled in the art will appreciate that other formulas for estimating the desirability of caching O can be used. The patent application, Challenger et al., describes the preferred method for estimating a, p and u. One skilled in the art will also appreciate that other methods for estimating these quantities could be used.

Let r1 be a cache replacement policy designed to minimize the consumption of server processing resources. The preferred embodiment of r1 is described in Challenger et al. Other embodiments of r1 can be used in the present invention as well.

Suppose that, instead, router processing power is the bottleneck in the system. The desirability of caching an object O at the level 1 cache 30 is proportional to the expected number of hits to O per unit time if it is cached divided by the size of O. One formula for estimating the desirability is:

$$d2(O)=(1/a-p/u)/s.$$

One skilled in the art will appreciate that other formulas could be used for estimating the desirability of caching O as well.

Let r2 be a cache replacement policy designed to minimize the consumption of router processing resources. The preferred embodiment of r2 is to use the approach contained in Challenger et al., but to use d2(O) to estimate the desirability of caching O instead of d1(O). Other embodiments of r2 can be used in the present invention as well.

Suppose that, instead, the network between the router 20 and the server(s) 40 is the bottleneck in the system. The desirability of caching an object O at the level 1 cache 30 is proportional to the expected number of hits to O per unit time, if it is cached. One formula for estimating the desirability is:

$$d3(O)=1/a-p/u.$$

One skilled in the art will appreciate that other formulas can be used for estimating the desirability of caching O.

Let r3 be a cache replacement policy designed to minimize network traffic between the router and the server(s). The preferred embodiment of r3 is to use the approach contained in Challenger et al., but to use d3(O) to estimate the desirability of caching O instead of d1(O). Other embodiments of r3 can be used in the present invention as well.

FIG. 4 depicts the preferred algorithm for handling cache replacement at the level 1 cache 30 according to the present invention. The basic approach is to use a combination of different cache replacement policies, each designed to minimize consumption of a different resource. When a particular resource becomes a bottleneck, the proportion of the cache managed by the policy designed to minimize consumption of that resource is increased.

In step 400, the level 1 cache 30 is initialized to handle replacement by managing x % of the bytes in the cache using r1, y % using r2, and z % using r3 where 100>=x,y,z>=0 and x+y+z=100. The values of x, y, and z are determined from default initialization parameters.

In step 410, the level 1 cache 30 performs traditional cache operations such as insertions, invalidations and lookups. It is preferable that the system concurrently checks for bottlenecks using methods known in the prior art. If the router 20 is not a system bottleneck, the router 20 will often try to satisfy all requests from its cache 30. If, however, the router 20 starts to become the sole bottleneck, it may try to route some requests directly to the server(s) 40 without examining its cache. Routing requests to servers 40 without trying to perform a lookup in the router cache 30 entails less router overhead.

If at some point, the system recognizes that some of the servers 40 (but not all) have become bottlenecks (step 431), load balancing is used to remove the server bottlenecks in step 428.

If, at some point, the system recognizes that all of the servers 40 become bottlenecks (step 490), the system determines, in step 480, if the entire cache 30 is managed using r1. If the answer is no, the amount of cache 30 managed using r1 is increased in step 470. If, on the other hand, the answer is yes, the system determines, in step 413, whether the router 20 is also a bottleneck. If so, there is nothing obvious that can be done to improve system throughput and processing returns to step 410. If the answer is no, the system, in step 416, decreases the proportion of requests which bypass the router cache 30 (if nonzero).

If, at some point, the system recognizes that the router 20 becomes a bottleneck (step 420), the system determines, in step 430, whether the entire cache 30 is managed using r2. If the answer is no, the amount of cache 30 managed using r2 is increased in step 440. If, on the other hand, the answer is yes, the system determines, in step 450, whether the server(s) 40 or the network between the router and server(s) 58 is also a bottleneck. If so, there is nothing obvious that can be done to improve system throughput and processing returns to step 410. If the answer is no, the system, in step 460, increases the proportion of requests which bypass the router cache 30 (if less than 1).

If, at some point, the system recognizes that the network 58 between the router and server(s) becomes a bottleneck (step 425), the system determines, in step 422, whether the entire cache 30 is managed using r3. If the answer is no, the amount of cache 30 managed using r3 is increased in step 419. If, on the other hand, the answer is yes, the process continues to step 413 and the system proceeds as described hereinabove.

Figure 5:
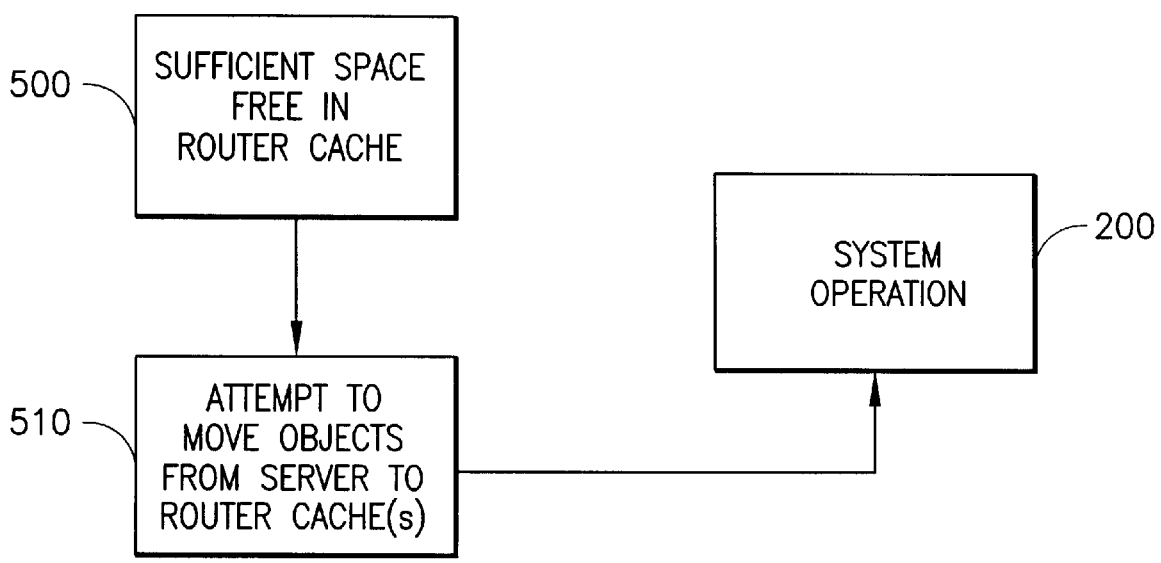
FIG. 5 is a block diagram of an algorithm for moving objects from one or more server caches to a router cache according to an embodiment of the present invention.

Another feature of the present invention is depicted in FIG. 5. When sufficient space becomes available in the router cache 30 after a period when objects had to be rejected or replaced from the cache 30 due to the cache 30 being full (step 500), the system may attempt to move or copy one or more objects from one or more of the server caches 50 to the router cache 30 in step 510. The system then proceeds with general operations in step 200.

Figure 6:
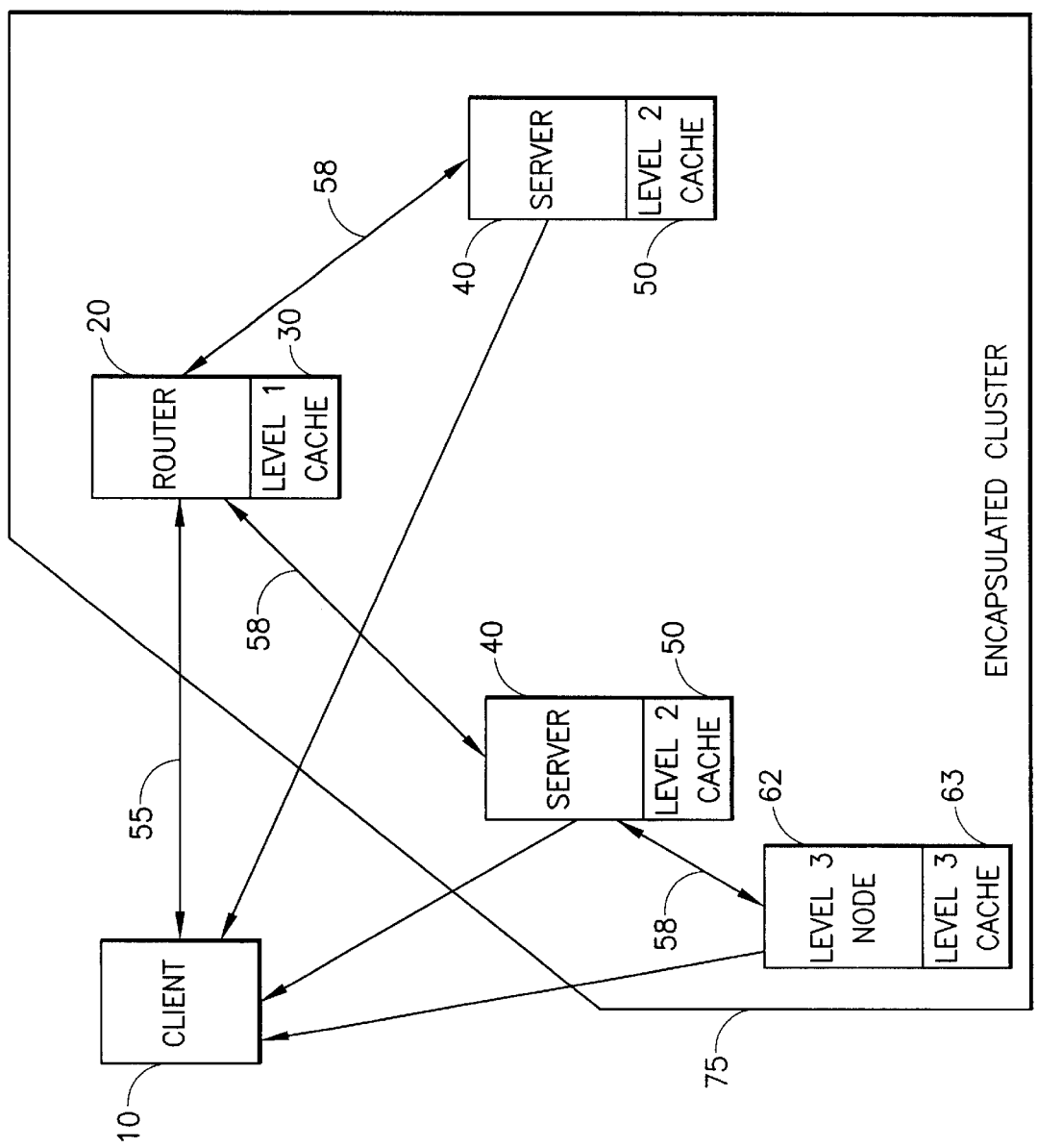
FIG. 6 is a schematic diagram of an embodiment of the hierarchical caching system of the present invention with more than two levels in the hierarchy.

It is possible to have more than two levels in the caching hierarchy according to the present invention. FIG. 6 depicts a system which has an encapsulated cluster 75 with a level 3 node 62 having an accompanying level 3 cache 63. There can be more than one level 3 nodes 62 in this embodiment. Here, requests are sometimes directed to the level 3 nodes 62 if they cannot be handled by the level 2 nodes 40. In general, it is possible to have n levels in the hierarchy for any finite positive integer n.

In another feature of the present invention, it may be desirable to not cache some hot or other objects in the router cache 30. For example, though hot, an object may be too large, and may be better cached in the server cache 50. The overhead for serving such objects can be lowered if it is determined, at the router 20, that the object will not be cached, before sending the request to the server 40. If this is done, one can avoid examining and starting to cache the object on the return path from the server 40. Those skilled in the art will readily appreciate that the response can be directly and efficiently sent back to the client 10. Alternatively, the request can be handed off to the server 40 and returned directly to the client 10, bypassing the router 20 (or handed off to a different router to handle on the return path to the client 10).

In order to determine whether an object requested by the client 10 is to be cached at the router cache 30, statistics of (hot) data not in the router cache 30 are also preferably maintained at the router cache 30. This can be accomplished by maintaining a list, ordered by LRU information, of items that should not be cached at the router cache 30, due to size or other specific reasons. Configuration at the router 20 may also include specification of some such objects, classes of objects, or directories of objects that should not be cached in the router cache 30.

Now that the invention has been described by way of a preferred embodiment, various modifications and improvements will occur to those of skill in the art. Thus, it should be understood that the preferred embodiment is provided as an example and not as a limitation. The scope of the invention is defined by the appended claims.

We claim:

1. A system for hierarchically caching objects comprising:

one or more level 1 nodes, each including at least one level 1 cache;

one or more level 2 nodes within which the objects are capable of being permanently stored and, if not permanently stored, then created upon request by at least one program respectively executed at the one or more level 2 nodes, each level 2 node coupled to at least one of the one or more level 1 nodes and including one or more level 2 caches; and means for storing, in a coordinated manner, one or more objects in at least one of at least one level 1 cache and at least one level 2 cache, based on a set of one or more criteria, wherein the set of one or more criteria comprises at least one of: a storage space available in one or more of the caches, a CPU load on one or more of the level 1 nodes, a CPU load or one or more of the level 2 nodes, a pattern of data accesses to one or more of the objects, a frequency of update of one or more of the objects, a time to create or fetch one or more of the objects, and network traffic between one or more of the level 1 nodes and one or more of the level 2 nodes.

2. The system of claim 1 wherein the one or more level 1 nodes comprise one or more Web server accelerators.

3. The system of claim 1 wherein the one or more level 1 nodes comprise one or more routers.

4. The system of claim 1 wherein the one or more level 2 nodes comprise one or more Web servers.

5. The system of claim 1 wherein the nodes are disposed within an encapsulated cluster.

6. The system of claim 1 further comprising one or more level 3 nodes coupled to at least one of the one or more level 2 nodes and wherein the means for storing comprises a means for storing one or more objects in at least one level 3 cache and/or at least one of the at least one level 1 cache, the at least one level 2 cache and the at least one level 3 cache.

7. A system for hierarchically caching objects comprising:
one or more level 1 nodes, each including at least one level I cache, for all integers I such that L>=I>0 where L>=3, wherein the objects are capable of being permanently stored and, if not permanently stored, then created by at least one program respectively executed at the one or more level I nodes; and
means for storing, in a coordinated manner, one or more of the objects in at least one of at least one level j cache and at least one level k cache where L>=k>j>0, based on a set of one or more criteria,
wherein the set of one or more criteria comprises at least one of: a storage space available in one or more of the caches, a CPU load on one or more of the level 1 nodes, a CPU load on one or more of the level 2 nodes, a pattern of data accesses to one or more of the objects, a frequency of update of one or more of the objects, a time to create or fetch one or more of the objects, and network traffic between one or more of the level 1 nodes and one or more of the level 2 nodes.

8. A method for caching objects comprising the steps of:
creating one or more level 1 nodes, each including at least one level 1 cache;
creating one or more level 2 nodes within which the objects are capable of being permanently stored and, if not permanently stored, then created upon request by at least one program respectively executed at the one or more level 2 nodes, each level 2 node coupled to at least one of the one or more level 1 nodes and including one or more level 2 caches; and
storing one or more objects in at least one of at least one level 1 cache and at least one level 2 cache, in a coordinated manner based on a set of one or more criteria,
wherein the set of one or more criteria comprises at least one of: a size of one or more of the objects, a storage space available in one or more of the caches, a CPU load on one or more of the level 1 nodes, a CPU load on one or more of the level 2 nodes, a pattern of data accesses to one or more of the objects, a frequency of update of one or more of the objects, a time to create or fetch one or more of the objects, and network traffic between one or more of the level 1 nodes and one or more of the level 2 nodes.

9. The method of claim 8 further comprising the steps of:
receiving, at the one or more level 1 nodes, a request for an object from a client;
determining whether the requested object is in the at least one level 1 cache;
transmitting, in response to the object being found in the at least one level 1 cache, the object from the at least one level 1 cache to the client; and
attempting, in response to the object not being found in the at least one level 1 cache, to satisfy the request from the at least one level 2 cache.

10. The method of claim 9 wherein the attempting step comprises the steps of:
forwarding the object to at least one of the one or more level 2 nodes;
determining whether the object is in at least one level 2 cache corresponding to the at least one of the one or more level 2 nodes; and
sending, in response to the object being found in the at least one level 2 cache, the object from the level 2 cache to the client.

11. The method of claim 10 further comprising the steps of:
identifying the object as being cacheable at the at least one level 1 cache; and
moving the object or a copy of the object to a level 1 cache.

12. The method of claim 9 further comprising the steps of:
determining, in response to the object not being found in the at least one level 1 cache, whether the requested object should be cached in any level 1 cache; and
satisfying the request, in response to the determination that the object should not be cached in any level 1 cache.

13. The method of claim 12 wherein the satisfying step comprises the step of returning a response to the client from a level 2 node through at least one of the one or more level 1 nodes, thereby bypassing the at least one level 1 cache.

14. The method of claim 12 wherein the satisfying step comprises the step of returning a response to the client from a level 2 node, bypassing at least one of the one or more level 1 nodes.

15. The method of claim 8 wherein, at any specific time, an object is stored in, at most, one of the level 2 caches.

16. The method of claim 8 further comprising the step of preventing the caching of an object in a level 2 cache where a cost of providing the object from the level 2 cache is high relative to a cost of fetching or generating the object from a level 2 node corresponding to the level 2 cache.

17. The method of claim 16 wherein the cost of providing the object from the level 2 cache includes a cost of at least one invalidation and update of the object in the cache after its value changes.

18. The method of claim 8 further comprising the step of caching, in response to a level 1 cache being full, an object in a level 2 cache.

19. The method of claim 8 further comprising the step of preventing an object from being cached in a level 1 cache.

20. The method of claim 17 further comprising the step of allowing the object to be cached in at least one level 2 cache.

21. The method of claim 19 wherein the preventing step is made necessary due to a difficulty of maintaining sufficiently current values of the object in the level 1 cache.

22. The method of claim 19 wherein the preventing step is made necessary because the request for the object causes a side effect on a level 2 node.

23. The method of claim 8 wherein the storing step comprises the step of determining the object to be a general cache candidate.

24. The method of claim 23 wherein the determining step comprises the step of checking a text string or header information associated with the object.

25. The method of claim 23 wherein the determining step comprises the step of applying a function to the object.

26. The method of claim 25 wherein the applying step comprises the step of determining the size of the object.

27. The method of claim 25 wherein the applying step comprises the step of determining the expected lifetime of the object.

28. The method of claim 8 wherein the storing step comprises the step of identifying the object to be a level 1 cache candidate.

29. The method of claim 28 wherein the identifying step comprises the step of determining the size of the object.

30. The method of claim 28 wherein the identifying step comprises the step of determining any limits in logging facilities of the associated level 1 node.

31. The method of claim 28 wherein the identifying step comprises the step of determining sufficient space in the level 1 cache.

32. The method of claim 8 wherein the storing step comprises the step of identifying the object to be a level 2 cache candidate.

33. The method of claim 32 wherein the identifying step comprises the step of determining the object not to be a level 1 cache candidate.

34. The method of claim 32 wherein the identifying step comprises the step of determining the size of the object.

35. The method of claim 32 wherein the identifying step comprises the step of determining sufficient space in the level 2 cache.

36. The method of claim 8 wherein the storing step comprises the step of applying a cache replacement policy.

37. The method of claim 36 wherein the applying step comprises the steps of:
applying, for part of the at least one level 1 cache, a cache replacement policy designed to minimize utilization of a set of one or more resources in the system; and
using, for other parts of the at least one level 1 cache, one or more other cache replacement policies designed to minimize utilization of one or more other sets of one or more resources in the system.

38. The method of claim 8 wherein the storing step comprises the step of maintaining information that one or more objects should not be cached in at least one level 1 cache.

39. A method for caching objects comprising the steps of:
creating one or more level I nodes, each including at least one level I cache, for all integers I such that $L>=I>0$, where $L>=3$, wherein the objects are capable of being permanently stored and, if not permanently stored, then created by at least one program respectively executed at the one or more level I nodes; and
storing, in a coordinated manner, one or more objects in at least one of at least one level j cache and at least one level k cache where $L>=k>j>0$, based on a set of one or more criteria,
wherein the set of one or more criteria comprises at least one of: a storage space available in one or more of the caches, a CPU load on one or more of the level 1 nodes, a CPU load on one or more of the level 2 nodes, a pattern of data accesses to one or more of the objects, a frequency of update of one or more of the objects, a time to create or fetch one or more of the objects, and network traffic between one or more of the level 1 nodes and one or more of the level 2 nodes.

40. In a system adapted to receive requests for objects from one or more clients, the system having a set of one or more level 1 nodes, each containing at least one level 1 cache, a method for managing a level 1 cache comprising the steps of:
applying, for part of the at least one level 1 cache, a cache replacement policy designed to minimize utilization of a set of one or more resources in the system; and
using, for other parts of the at least one level 1 cache, one or more other cache replacement policies designed to minimize utilization of one or more other sets of one or more resources in the system.

41. The method of claim 40 wherein the cache replacement policy is designed to minimize resources on a level 1 node containing the level 1 cache.

42. The method of claim 41 wherein the cache replacement policy estimates a desirability of caching an object from an expected number of hits to the object per unit time if the object is cached divided by a size of the object.

43. The method of claim 42 wherein the cache replacement policy estimates the desirability of caching the object by calculating or estimating the quantity $(1/a-p/u)/s$, where a is the expected time between successive requests for the object, u is the expected time between successive updates of the object, p is the probability that the object will be accessed between successive updates to the object, and s is the size of the object.

44. The method of claim 40 wherein the system further has one or more level 2 nodes coupled to one or more of the level 1 nodes and wherein the cache replacement policy is designed to minimize resources on at least one level 2 node.

45. The method of claim 44 in which the cache replacement policy estimates the desirability of caching an object from the expected number of hits to the object per unit time if it is cached multiplied by the expected processing time on one or more of the level 2 nodes to fetch or calculate the object divided by the size of the object.

46. The method of claim 45 in which the cache replacement policy estimates the desirability of caching the object by calculating or estimating the quantity $(t/a-t*p/u)/s$, where a is the expected time between successive requests for the object, t is the expected processing time on one or more of the level 2 nodes to fetch or calculate the object, u is the expected time between successive updates of the object, p is the probability that the object will be accessed between successive updates to the object, and s is the size of the object.

47. The method of claim 40 wherein the system further has one or more level 2 nodes and one or more networks located between the one or more level 1 nodes and the one or more level 2 nodes and wherein the cache replacement policy is designed to minimize traffic on one or more of the networks.

48. The method of claim 47 wherein the cache replacement policy estimates the desirability of caching an object from the expected number of hits to the object per unit time if the object is cached.

49. The method of claim 48 wherein the cache replacement policy estimates the desirability of caching the object by calculating or estimating the quantity $1/a-p/u$, where a is the expected time between successive requests for the object, u is the expected time between successive updates of the object, and p is the probability that the object will be accessed between successive updates to the object.

50. The method of claim 40 further comprising the step of dynamically varying the parts of the level 1 cache managed by at least one of the cache replacement policies.

51. The method of claim 40 further comprising the steps of:
determining one or more resource bottlenecks corresponding to one or more resources; and
dynamically varying, in response to the determining step, the parts of the level 1 cache managed by at least one of the cache replacement policies.

52. The method of claim 51 wherein the dynamically varying step comprises the step of increasing, in response to the determining step, the part of the level 1 cache managed by a cache replacement policy designed to minimize utilization of the one or more resources.

53. The method of claim 52 wherein the system further has one or more level 2 nodes and one or more networks between the one or more level 1 nodes and the one or more level 2 nodes and wherein the one or more resources becoming a bottleneck contain at least one of: processing power of the level one node containing the level 1 cache, processing power of at least one of the level 2 nodes and bandwidth of at least one of the networks.

54. The method of claim 40 wherein the system further comprises one or more level 2 nodes coupled to one or more level 1 nodes, the method further comprising the step of:

determining a level 1 node to be a bottleneck in the system; and sending, in response to the determining step, one or more requests to one or more level 2 nodes without first attempting to satisfy the one or more requests from a level 1 cache on the level 1 node.

55. The method of claim 40 wherein the system further comprises one or more level 2 nodes and a network between the one or more level 1 nodes and the one or more level 2 nodes, the method further comprising the steps of:

determining at least one of the network or the level 2 nodes to be a bottleneck in the system; and reducing, in response to the determining step, the number of requests sent to one or more level 2 nodes without first attempting to satisfy the request from a level 1 cache.

56. In a system for receiving requests for objects from one or more clients, the system having one or more level 1 nodes, each containing at least on level 1 cache, and having one or more level 2 nodes coupled to one or more of the level 1 nodes, a method for handling requests in the system comprising the steps of:

determining a level 1 node to be a bottleneck in the system; and sending, in response to the determining step, one or more requests to one or more level 2 nodes without first attempting to satisfy the one or more requests from a level 1 cache on the level 1 node.

57. The method according to claim 56, wherein said determining step is irrespective of whether or not the one or more requests have been attempted to be satisfied from the level 1 cache on the level 1 node.

58. In a system for receiving requests for objects from one or more clients, the system having a set of one or more level 1 nodes, each containing at least one level 1 cache, one or more level 2 nodes, and one or more networks between the one or more level 1 nodes and the one or more level 2 nodes, a method for handling requests in the system comprising the steps of:

determining at least one of the networks or at least one of the level 2 nodes to be a bottleneck in the system; and reducing, in response to the determining step, the number of requests sent to the one or more level 2 nodes without first attempting to satisfy the request from a level 1 cache.

59. A system for hierarchically caching objects comprising:

one or more level 1 nodes, each including at least one level 1 cache;

one or more level 2 nodes within which the objects are permanently stored or are generated upon request by at least one program respectively executed at the one or more level 2 nodes, each level 2 node coupled to at least one of the one or more level 1 nodes and including one or more level 2 caches; and means for storing, in a coordinated manner, one or more objects in at least one of at least one level 1 cache and at least one level 2 cache, based on a set of one or more criteria, wherein the set of one or more criteria comprises a CPU load on one or more of the level 1 nodes.

60. A system for hierarchically caching objects comprising:

one or more level 1 nodes, each including at least one level 1 cache;

one or more level 2 nodes within which the objects are permanently stored or are generated upon request by at least one program respectively executed at the one or more level 2 nodes, each level 2 node coupled to at least one of the one or more level 1 nodes and including one or mare level 2 caches; and means for storing, in a coordinated manner, one or more objects in at least one of at least one level 1 cache and at least one level 2 cache, based on a set of one or more criteria, wherein the set of one or more criteria comprises a CPU load on one or more of the level 2 nodes.

61. A system for hierarchically caching objects comprising:

one or mare level 1 nodes, each including at least one level 1 cache;

one or more level 2 nodes within which the objects are permanently stored or are generated upon request by at least one program respectively executed at the one or more level 2 nodes, each level 2 node coupled to at least one of the one or more level 1 nodes and including one or more level 2 caches; and means for storing, in a coordinated manner, one or more objects in at least one of at least one level 1 cache and at least one level 2 cache, based on a set of one or more criteria, wherein the set of one or more criteria comprises network traffic between one or more of the levels 1 nodes and one or more of the level 2 nodes.

62. A system for hierarchically caching objects comprising:

one or more level 1 nodes, each including at least one level 1 cache;

one or more level 2 nodes within which the objects are permanently stored or are generated upon request by at least one program respectively executed at the one or more level 2 nodes, each level 2 node coupled to at least one of the one or more level 1 nodes and including one or more level 2 caches; and means for storing, in a coordinated manner, one or more objects in at least one of at least one level 1 cache and at least one level 2 cache, based on a set of one or more criteria, wherein the set of one or more criteria comprises a time to create one or more of the objects.

\* \* \* \* \*